(12) United States Patent
Sokolla et al.

(10) Patent No.: US 7,699,398 B2
(45) Date of Patent: Apr. 20, 2010

(54) BACKREST UNIT FOR A MOTOR VEHICLE SEAT

(75) Inventors: Jörg Sokolla, Gelsenkirchen (DE); André Dick, Solingen (DE); Lutz Jonas, Weilerswist (DE); Andreas Müller, Düsseldorf (DE); Burckhard Becker, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 366 days.

(21) Appl. No.: 11/883,244

(22) PCT Filed: Nov. 2, 2005

(86) PCT No.: PCT/DE2005/001950

§ 371 (c)(1),
(2), (4) Date: Jul. 27, 2007

(87) PCT Pub. No.: WO2006/079300

PCT Pub. Date: Aug. 3, 2006

(65) Prior Publication Data

US 2008/0150340 A1    Jun. 26, 2008

(30) Foreign Application Priority Data

Jan. 28, 2005   (DE) .................. 10 2005 004 271
Jul. 5, 2005    (DE) .................. 10 2005 031 252

(51) Int. Cl.
*B60N 2/02* (2006.01)
(52) U.S. Cl. ................. 297/377; 297/378.13; 296/65.17
(58) Field of Classification Search ............ 297/378.13, 297/377; 296/65.17
See application file for complete search history.

(56) References Cited

U.S. PATENT DOCUMENTS

| 5,022,698 | A  | * | 6/1991  | Butt et al. ............... 296/65.09 |
| 6,312,055 | B1 | * | 11/2001 | Uematsu ................ 297/378.13 |
| 6,874,840 | B2 | * | 4/2005  | Neale .................... 297/378.13 |
| 7,484,807 | B2 | * | 2/2009  | Okazaki et al. ......... 297/378.13 |
| 2001/0001562 | A1 | * | 5/2001 | Moon .................... 296/65.17 |

* cited by examiner

*Primary Examiner*—Anthony D Barfield
(74) *Attorney, Agent, or Firm*—McCarter & English, LLP (57) ABSTRACT

The invention relates to a backrest unit for a motor vehicle seat, in particular a rear seat comprising a backrest and support connected thereto. A guide rail is arranges on the rear surface of the backrest on an x-z plane. A slide is movably mounted on the guide rail and is lockable therein in different positions. When a control device associated with the slide is actuated, it brings the slide from a normally locking position into a released position. A support comprises a near end which is hinged on the slide and a distant end which is fixable to a bodywork part.

16 Claims, 12 Drawing Sheets

BACKREST UNIT FOR A MOTOR VEHICLE SEAT

CROSS-REFERENCE TO RELATED APPLICATIONS

This application is the U.S. National Stage of International Application No. PCT/DE2005/001950, filed Nov. 2, 2005, which claims priority to German Application No. DE 10 2005 004 271.6, filed Jan. 28, 2005 and German Application No. DE 10 2005 031 252.7, filed Jul. 5, 2005, the contents of which are expressly incorporated by reference in their entirety as part of the present disclosure.

BACKGROUND

The invention relates to a backrest of a motor vehicle seat which is particularly suited for backrests of rear seats, e.g. for a third seat row and in particular for a backrest of a seat row that is immediately adjacent a trunk. The invention relates further to a motor vehicle equipped with a seat having such a backrest.

A backrest of a motor vehicle seat is known in the art which has a length-variable support hinged to its backside. The backrest is reclined more or less by varying the length of this support.

By reclining the backrest, more or less space can be made available behind the backrest. By reclining the backrest, the seat comfort on the associated seat is also modified. As a result, a compromise must be found somehow. But generally there is the possibility to enlarge the cargo area behind the seat at the expense of the seat part and vice versa.

This advantage, which is given in the backrest of the type mentioned herein above, is intended to be preserved while further improving this backrest. It is the object of the invention to further develop the seat back of the type mentioned herein above so as to allow for more flexible and better adjustable adjustment, more specifically so as to allow for skillfully concealing the adjustment possibility so that it is hardly visible from the outside.

SUMMARY

This object is solved by a backrest unit of a motor vehicle seat, in particular for a back seat, with a backrest and with a carrier to which the backrest is hinge-linked, wherein a guide rail located in the x-z plane is disposed on the backside of the backrest. A slide is provided that is slidably disposed in this guide rail and is lockable in different positions in the guide rail. Further provided is an actuation device that is associated with the slide and, upon actuation, brings the slide from a normally locking position into a released or free position, and a support that has a proximate end hinged to the slide and a remote end that is configured for fixation to a carbody part.

The backrest is fixed in its pivotal position through the support or rather the supporting arm. At a free, unlocked backrest hinge that is also referred to as a main pivot hinge, it is further connected to a carrier or rather a carrier structure connected to the associated motor vehicle. Upon changing the position of the slide, the backrest adopts another angular position. The slide is brought into a position in which it has come free by means of the actuation device, with the slide normally being in a locked position. In this locked position, it is locked in the guide rail. The actuation device has a handle that may be disposed in immediate proximity to the slide but that is preferably located in an upper region of the backrest for ease of access. The remote end of the support is disposed on a carbody part of the associated motor vehicle.

Advantageously, a trunk is located behind the backrest, which is equipped in accordance with the invention. Depending on the adjustment of the support, that is to say on the recline adjustment of the backrest, the trunk gets larger and the seat space smaller and vice versa.

Preferably, the backrest may be pivoted onto the seat part. Accordingly, a pivot angle of about 120° is preferably possible, said pivot angle may be greater or smaller and e.g., be 90° or 160°.

Advantageously, the support extends substantially in the x-z plane. It may have a small component in the transverse direction, meaning in the y-direction. The support is preferably disposed on the border of the trunk so as to hardly compromise it. It is preferably located in proximity to a carbody part of the motor vehicle, for example in proximity to a wheel arch. It is also preferred that the support be covered as far as possible in order to prevent injuries.

BRIEF DESCRIPTION OF THE DRAWINGS

Other features and advantages will become more apparent upon reviewing the appended claims and the following non restrictive description of embodiments of the invention, given by way of example only with reference to the drawing. In said drawing:

DETAILED DESCRIPTION

Figure 9:
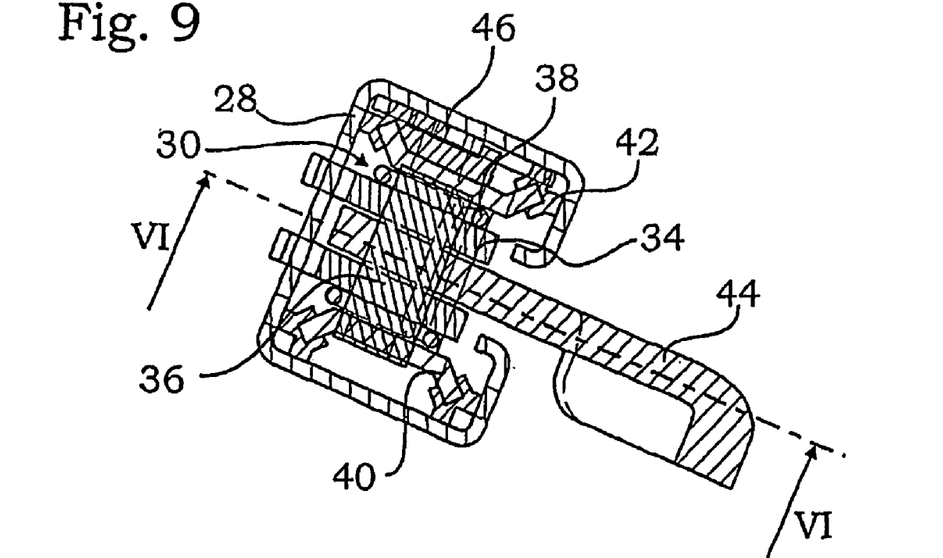
FIG. 9 is a sectional view taken along the section line IX-IX in FIG. 7.

The backrest unit will be explained herein after with reference to FIG. 1, like numerals being used throughout the figures to denote similar elements. The backrest unit of a motor vehicle seat has a backrest 20 and a carrier 22 that is normally fixed with respect to the carbody. The backrest 20 may be pivoted back and forth about a free, unlocked backrest hinge 24, e.g. into the positions shown in the FIGS. 2 and 3. On the backside 26 of the backrest 20 there is disposed a guide rail 28 that extends in the x-z plane. It may also extend slightly slantways, this is to say that it may have a component in the y-direction. The guide rail 28 substantially is a C-profile rail as it may be seen for example in the FIGS. 4 and 9. Such type rails are also utilized for length adjustment devices of motor vehicle seats. It forms an elongate channel-shaped cavity which it defines. This cavity is open in the longitudinal direction alongside a slot that is substantially defined by the free profile ends.

Instead of such a profile rail, rods, any other profiles, toothed racks and the like may be used as the guide rail.

Figure 6:
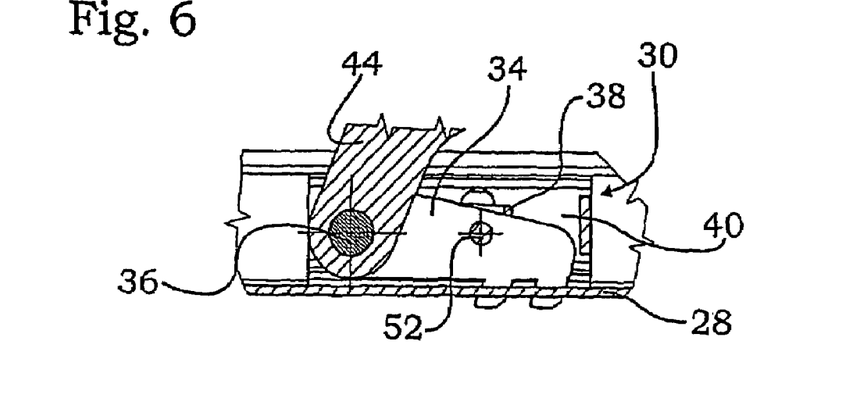
FIG. 6 is a sectional view taken along VI-VI in FIG. 9, meaning through the longitudinal center of the guide rail shown in FIG. 6.

In the guide rail 28, a slide 30 is slidably disposed which normally is locked in the guide rail 28. For this purpose, the guide rail 28 has detent recesses 32 and the slide 30 has at least one locking lever 34, in the exemplary embodiment shown it has two identically built locking levers 34. The locking lever 34 has two detent lugs engaging into the detent recesses 32; see for example FIGS. 6 and 7. The slide 30 has a pivotal axis 36 to which the two locking levers 34 are fastened. The locking levers 34 are retained in the locking position (FIG. 6) by a spring 38. The slide 30 further has a housing 40 in which the axis 36 is retained. The housing 40 has housing ends that abut on inner corners of the substantially square inner profile of the guide rail 28 via gliding members 42 that are for example made from plastic, see for example FIG. 9.

Figure 4:
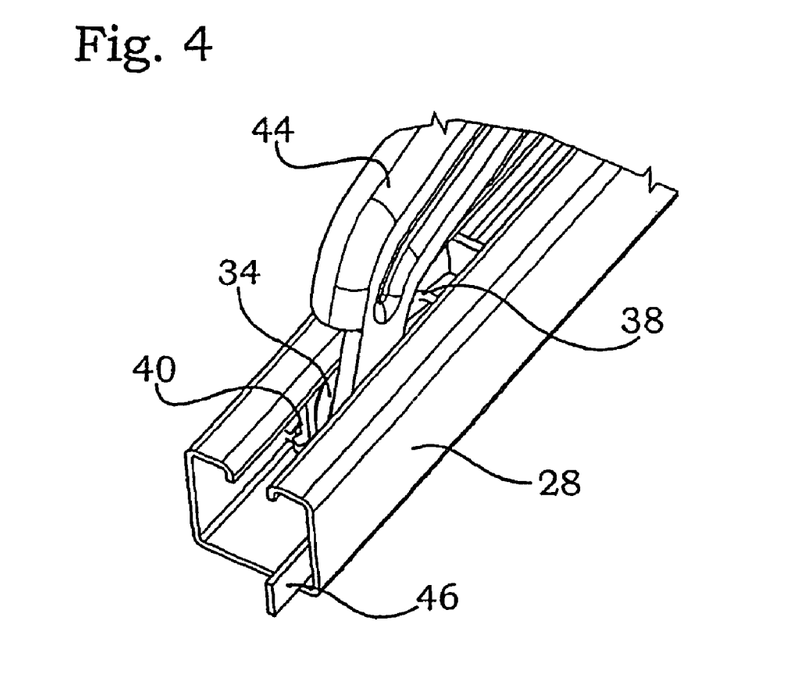
FIG. 4 is a perspective illustration of a guide rail in which there is located a slide, with a support hinged thereto and with a release rod.
Figure 5:
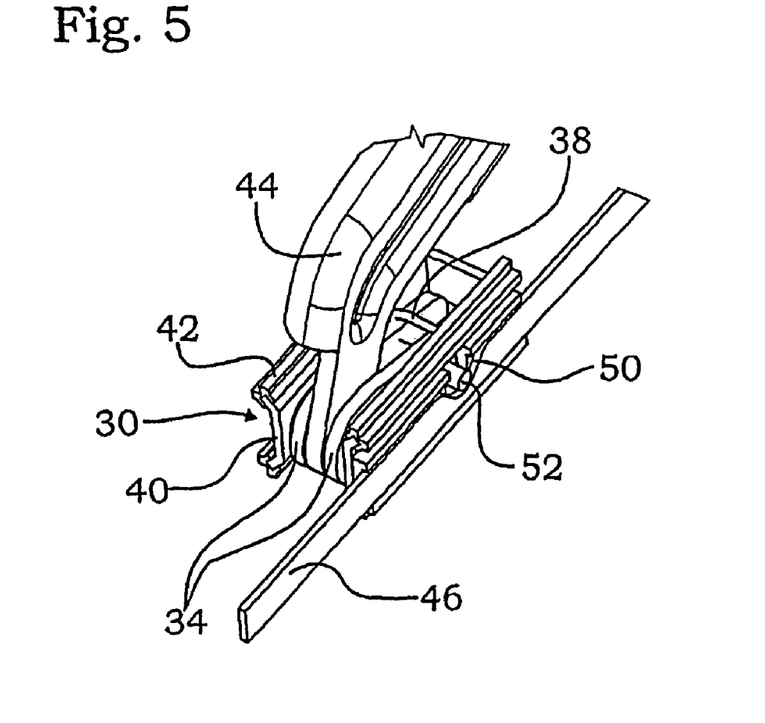
FIG. 5 is the illustration of FIG. 4, but without the guide rail.

A support 44 is hinged to the axis 36, in the center thereof; it projects through the longitudinal slot of the guide rail 28 outward. It is implemented as a profile part, see for example the FIGS. 4 and 5, in order not to bend away under too heavy a load. The backrest 20 is positioned and retained through the support 44, this also applies in case of loads exerted on the backrest in the event of an accident, so that the support 44 must be designed accordingly. If the support 44 were to bend away, the backrest 20 would no longer be held sufficiently.

Figure 10:
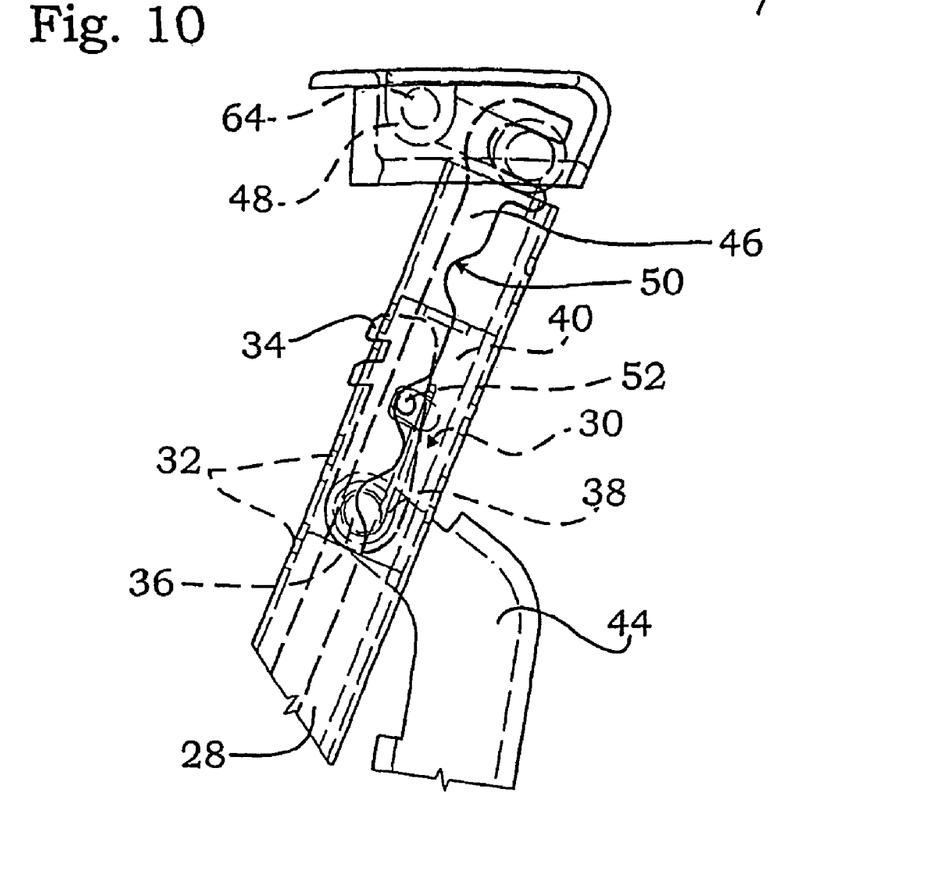
FIG. 10 is a side view of an upper region of a guide rail with an actuation device, a slide and a support, the unlocked state being shown.

An actuation device is provided for unlocking the slide 30. It comprises a release rod 46. Said rod projects as far as the upper edge of the backrest 20 where it is hinge-linked to a handgrip 48 that is also part of the actuation device. In the intervals in which there are provided the detent recesses 32, the release rod 46 has bights 50, FIG. 10 showing three such bights 50. They are preferably arranged at intervals, just like the detent recesses 32. They cooperate with a pin 52 that is connected to the two locking levers 34 and that protrudes transversely from them.

Figure 7:
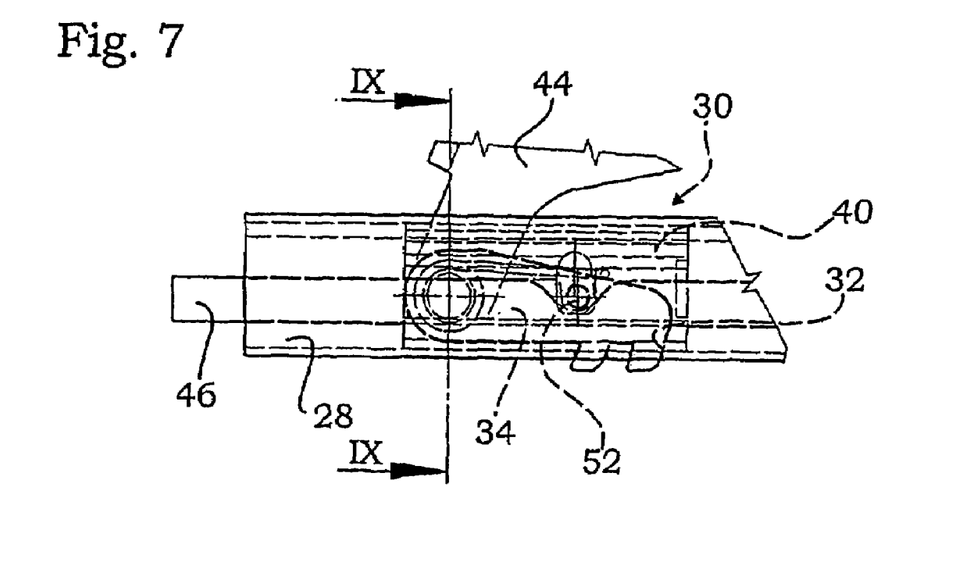
FIG. 7 is a side view in the same viewing direction like in FIG. 6, concealed parts being shown by a discontinuous line.
Figure 8:
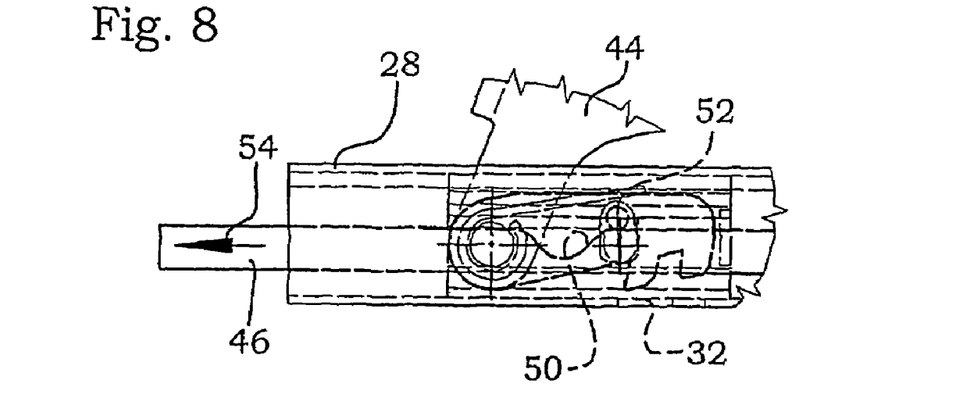
FIG. 8 is an illustration like FIG. 7, but in the unlocked position.

FIG. 7 shows the locked state. The pin 52 is located deep inside a bight 50, the two locking levers 34 engage with respective detent recesses 32.

If the release rod 46 is displaced, for example pulled upward pursuant to arrow 54 by means of the handgrip 48, the pin 52 glides out of the bight 50 and comes onto an upper edge of the release rod 46, in this position, the two locking levers 34 are raised and free from the detent recesses 32. In this position, the backrest 20 may now be adjusted. The backrest may be pivoted slightly farther backward than shown in FIG. 1, namely until the slide 30 is completely at the top of the backrest 20, but it may also be pivoted forward into the vertical position of FIG. 2 and even further forward into the forward tilted position shown in FIG. 3. In said last Fig., the slide is located at the other end of the longitudinal guide forming the guide rail 28. For any different position, detent recesses 32 may be provided according to wish. If the detent recesses 32 are arranged at intervals, it is possible to lock the backrest 20 in any graded position.

The support 44 has a proximate end by which it is hinge-linked to the slide 30. It also has a remote end 56 by which it is hinge-linked to a bearing part 58, which is again fastened to a carbody part 68, here on a wheel guard 60. The support 44 is located in the x-z plane. It may also have a certain component in the y direction, though. The support 44 may preferably be covered by a cover part 90, e.g., by a carpet or a corresponding component part. It is disposed in proximity to a vehicle outboard side so as to compromise as little as possible a trunk 62 that is located behind the backrest 20.

Figure 1:
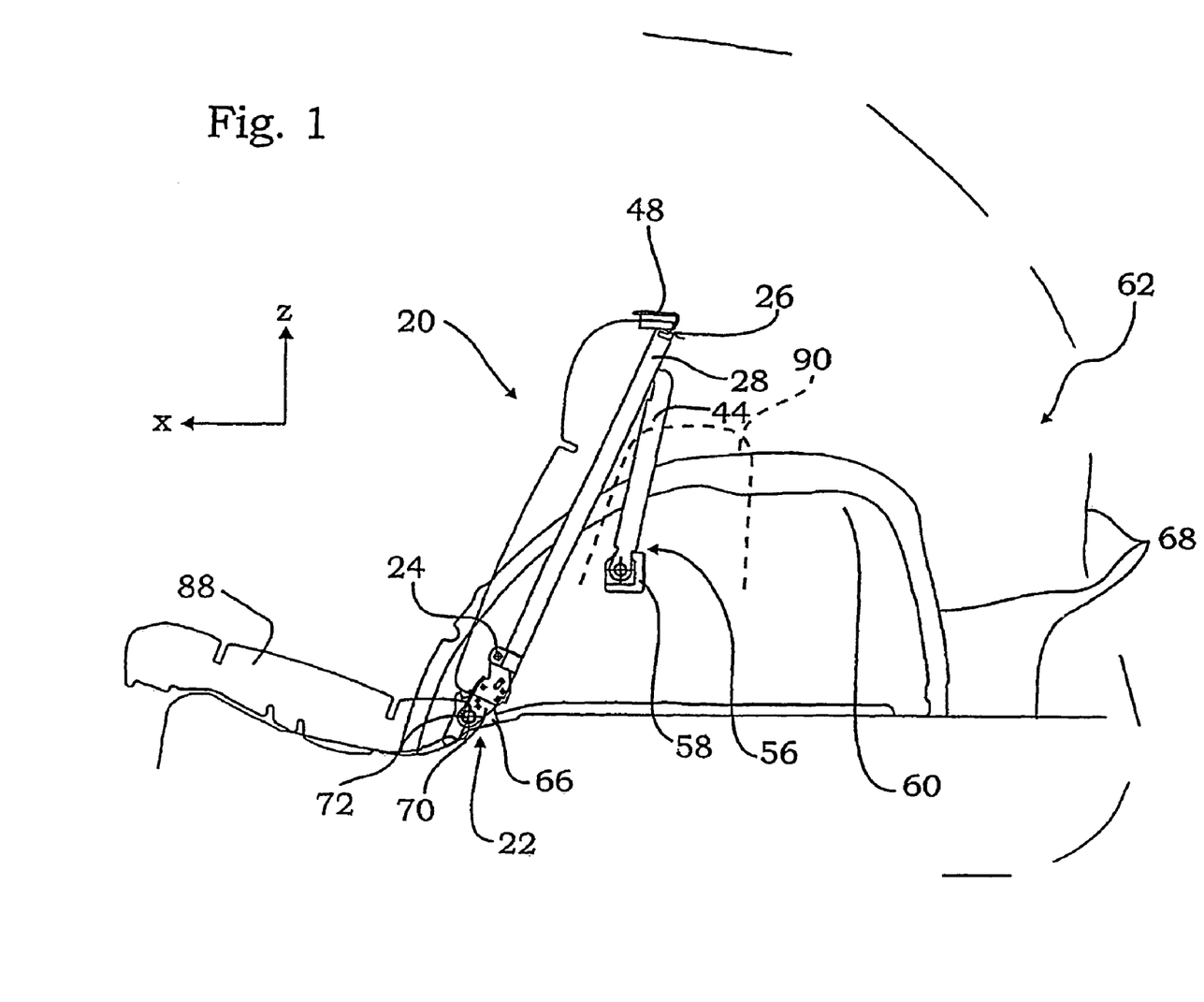
FIG. 1 is a schematic side view of a last seat row in a vehicle showing a wheel guard, a trunk and outlined limits of the carbody.
Figure 2:
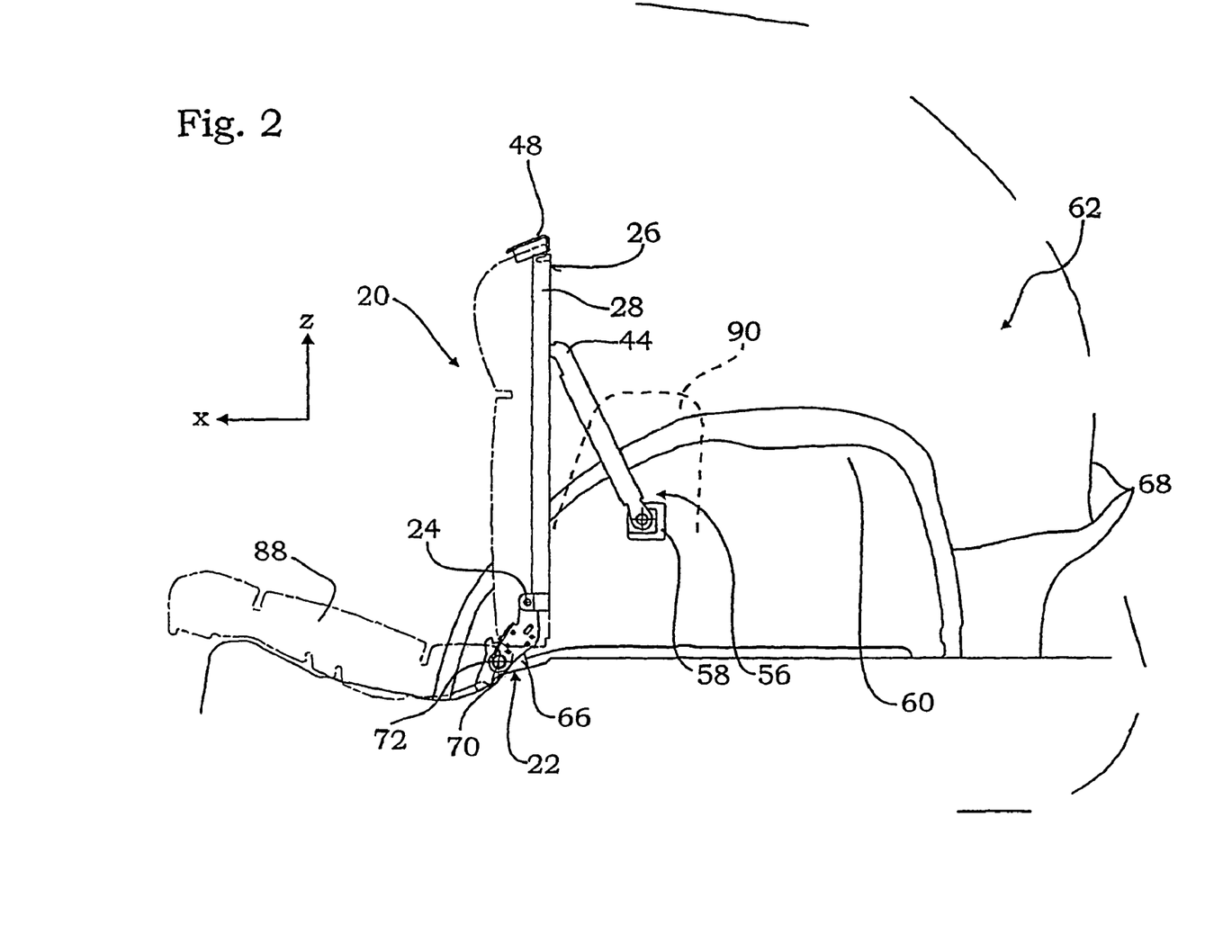
FIG. 2 is an illustration like FIG. 1 but for the backrest which now is in a vertical position.
Figure 3:
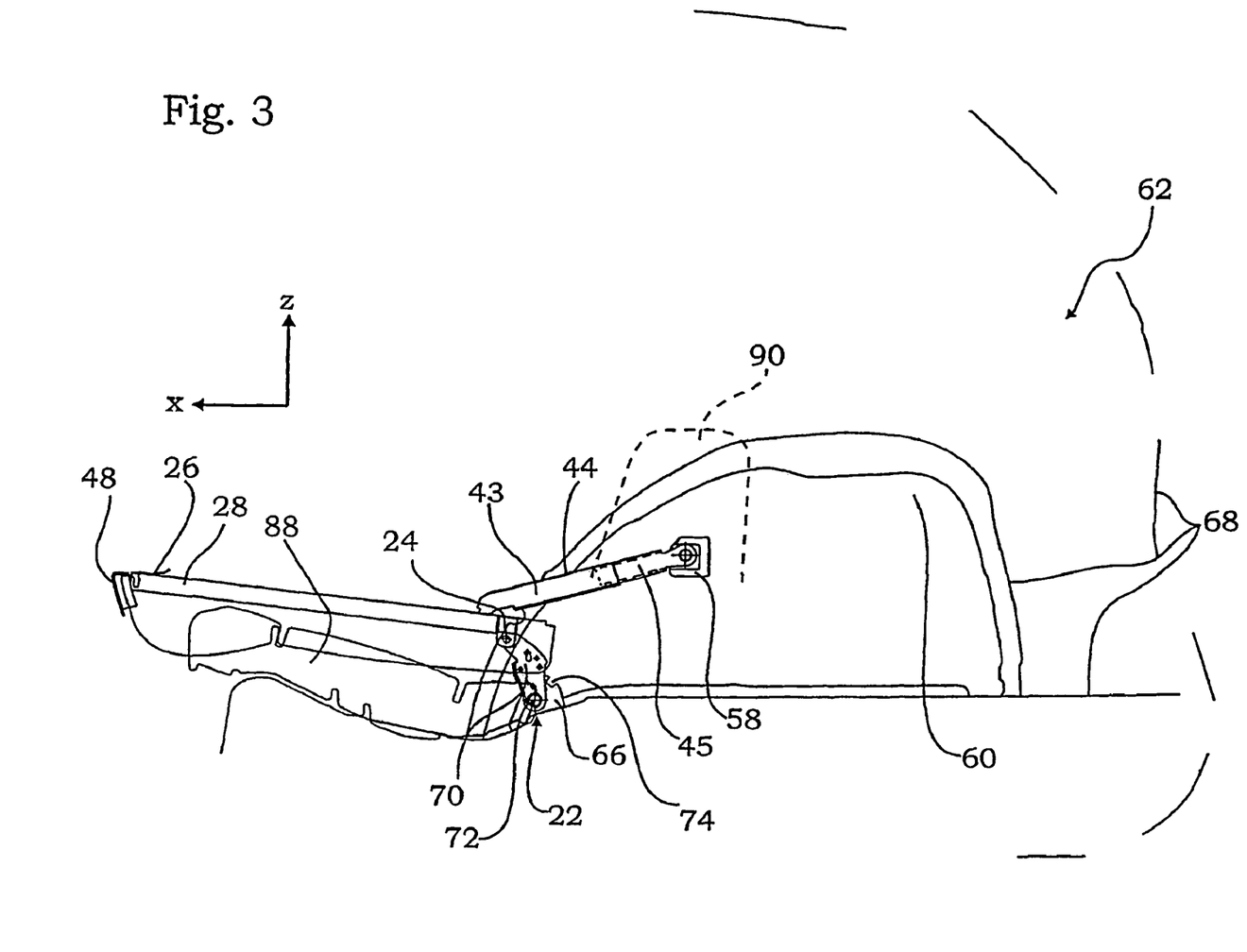
FIG. 3 is an illustration like FIG. 1, but for the backrest which now is completely tilted forward and for one carrier that is displaced forward; there is provided a length-variable support.

Reviewing FIG. 1 through 3 concurrently, it appears that the support 44 may adopt various angles with respect to the guide rail 28, the angular range being at most 180° minus twice the angle for self-locking between the materials used. In an alternative, it is also possible to form the support 44 from two parts 43, 45, see FIG. 3, said parts being slidable with respect to each other, telescopingly guided and capable of being joined together through a suited locking device (not shown). There are many prior art possibilities for forming such type length-variable supports 44. As also appears reviewing FIG. 1 through 3 concurrently, the total length of the guide rail, which extends over almost the entire height of the backrest 20, is indeed fully utilized.

In the exemplary embodiment shown, the detent recesses 32 are provided in the bottom of the C-shaped guide rail 28. It is also possible to form them in the side walls or at another place. Detent projections may also be formed in the guide rail 28, with detent windows being then provided in the locking levers 34.

Figure 11:
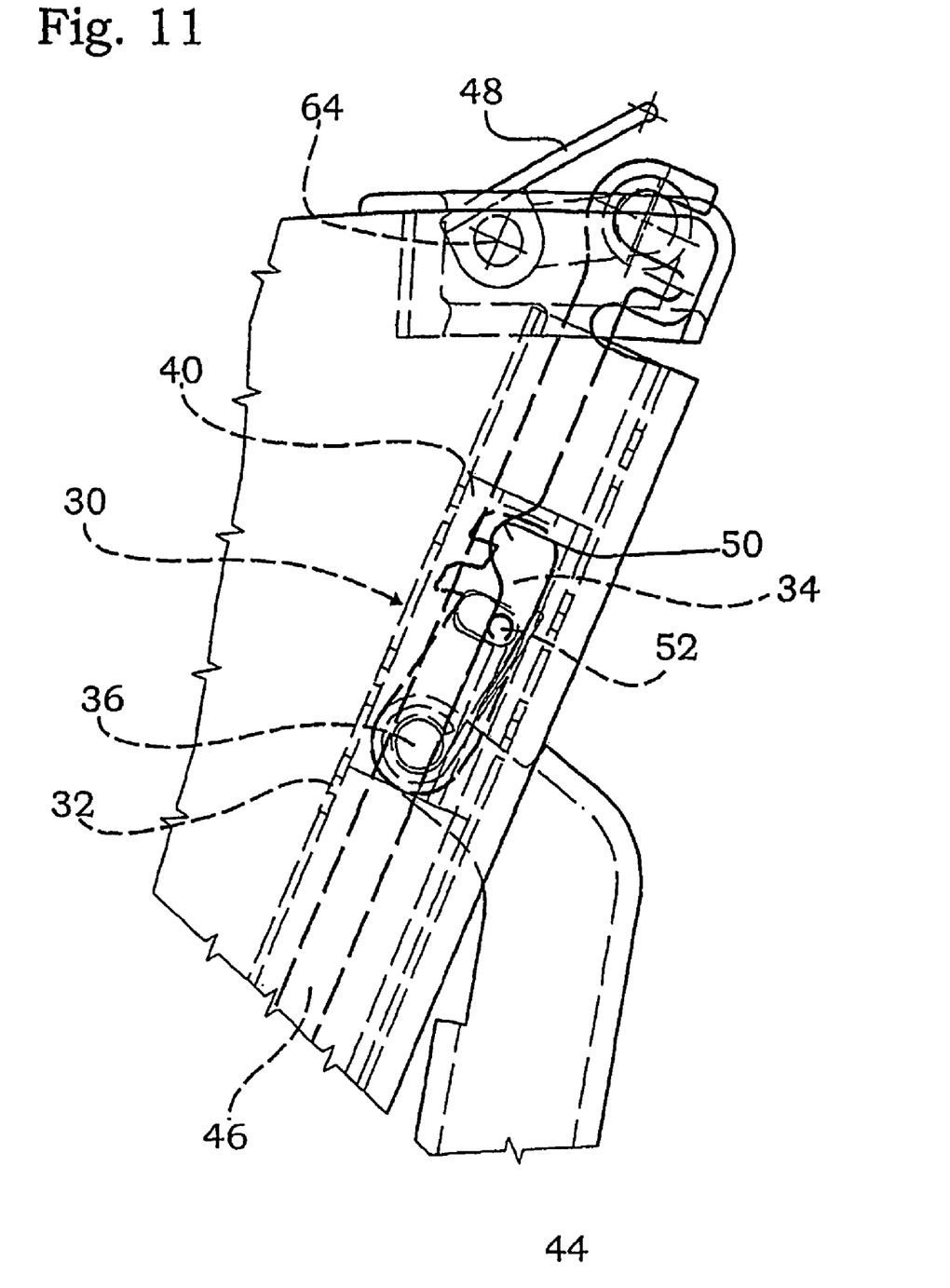
FIG. 11 is a view like FIG. 10 but now in the unlocked state.

The handgrip 48 is disposed in a frame part in the upper region of the backrest 20 so as to be pivotal about a pivot axis 64. The handgrip 48 is an approximately V-shaped part that is supported in the lower vertex of the V in the pivot axis 64. If the upper part, which forms a handle, is raised, the release rod 46 is pulled upward and the lock is unlocked, see FIG. 11. There is provided a spring for retaining the actuation device in the locked position as shown for example in FIG. 10. As soon as the handgrip 48 is released, the release rod 46 glides into a position allowing for locking. A relative movement between the slide 30 and the guide rail 28 is possibly still needed, but locking is achieved in the long run. Anyway, the slide 30 has an abutment at the uppermost end of the guide rail 28 so that a tilted position of the backrest is not possible beyond a backward reclined position of the backrest 20 that is tilted a few degrees further than shown in FIG. 1. As a result, safety is increased in the event of rear impact collisions.

Figure 16:
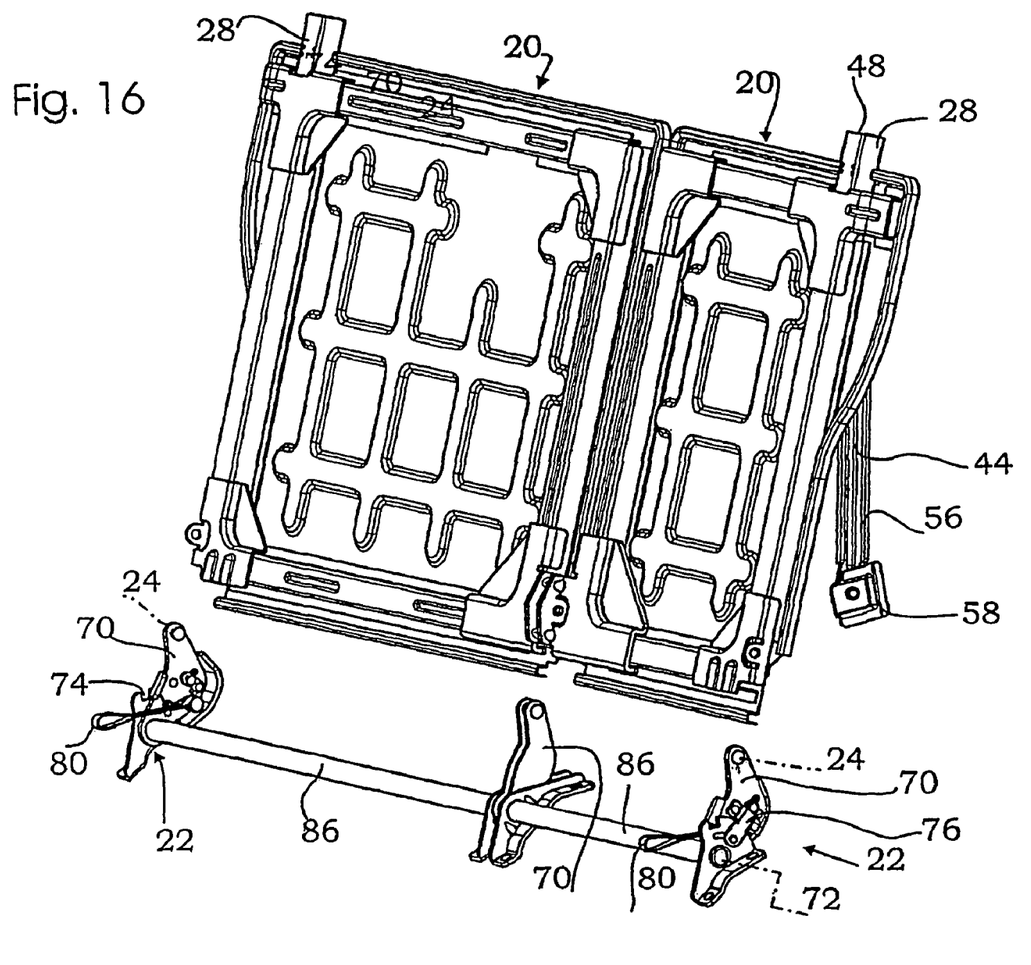
FIG. 16 is a perspective assembly drawing of a backrest arrangement with two separate backrests of different size.

FIG. 16 shows a practical implementation of the backrest unit for the exemplary embodiment discussed. There are seen two backrests of a seat row, the left backrest being provided for a double seat and the right one, for a single seat. Both are adjustable independently of each other. It appears that the guide rail 28 associated with each backrest 20 is displaced as far as possible with respect to the vehicle's outboard side. For the right backrest 20, the support 44 and the bearing part 58 can be seen. Concurrently, the guide rail 28 rigidifies the backrest 20.

Herein after, the carriers, more specifically the hinge intermediate parts shown in the FIGS. 12 through 16, are discussed. In principle, the backrest 20 can be hinged directly to a carrier 20 fixed on the carbody. In the exemplary embodiment shown, an intermediate piece is still mounted therein between; this will be explained herein after: The carrier 22 comprises a retaining part 66 that is connected to the carbody 68. In another implementation it is for example connected to a seat carrier. The carrier 22 further comprises a hinge intermediate part 70 that is hinge-linked to the retaining part 66 about an auxiliary pivot axis 72. The thus formed auxiliary pivot hinge is locked through a locking device that will be discussed herein after and is normally locked. The locking device can be seen in the FIGS. 12 through 15. Several locking bights 74 are formed in the retaining part 66. They cooperate with a locking bar 76 that is slidably disposed on the hinge intermediate part 70, a long hole being formed in the hinge intermediate part 70 for guiding said locking bar. In the implementation shown, only two locking bights 74 are provided, but it is also possible to provide more locking bights.

Figure 12:
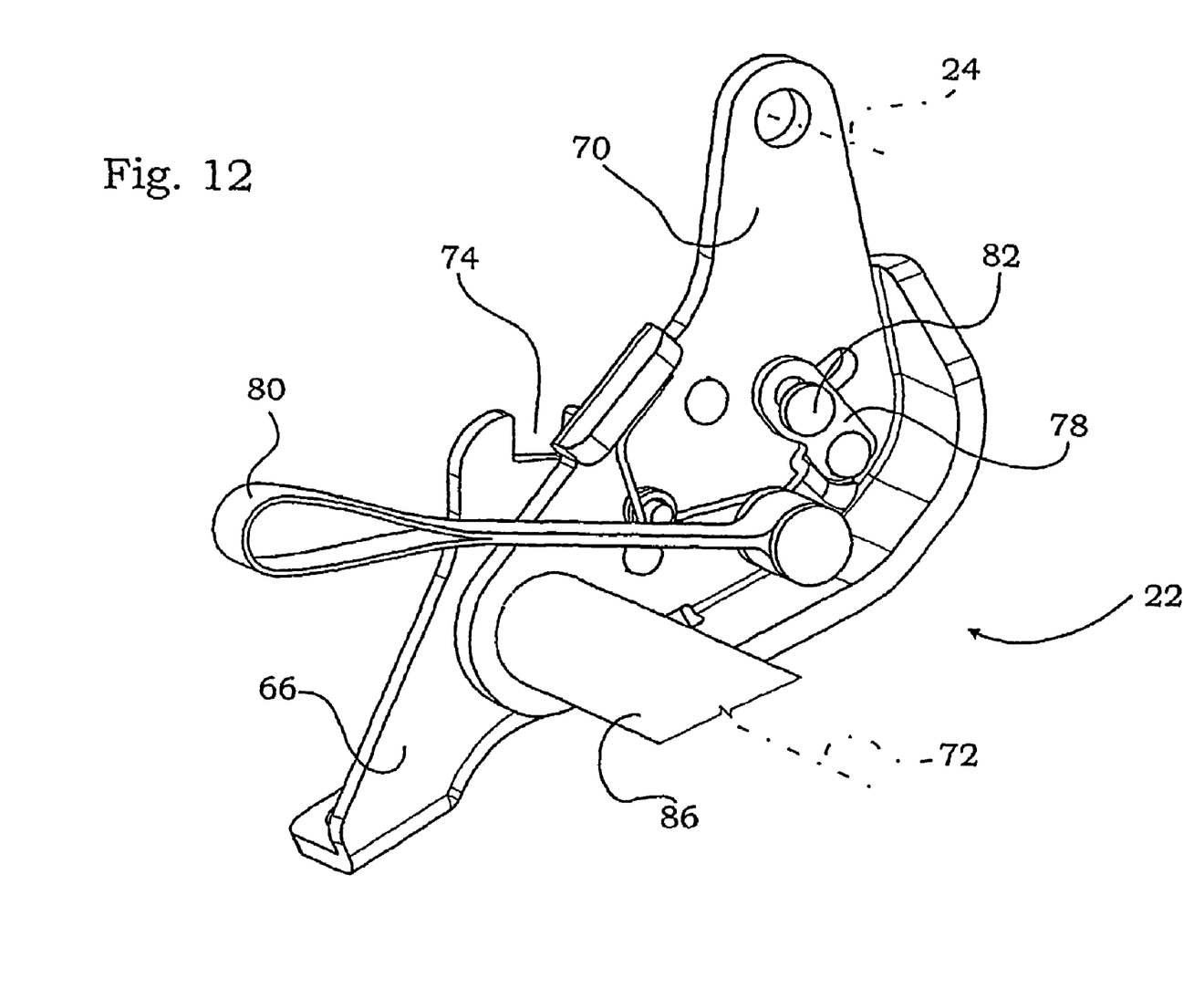
FIG. 12 is a perspective illustration of a hinge intermediate part intermediate the backrest and the carrier structure.
Figure 13:
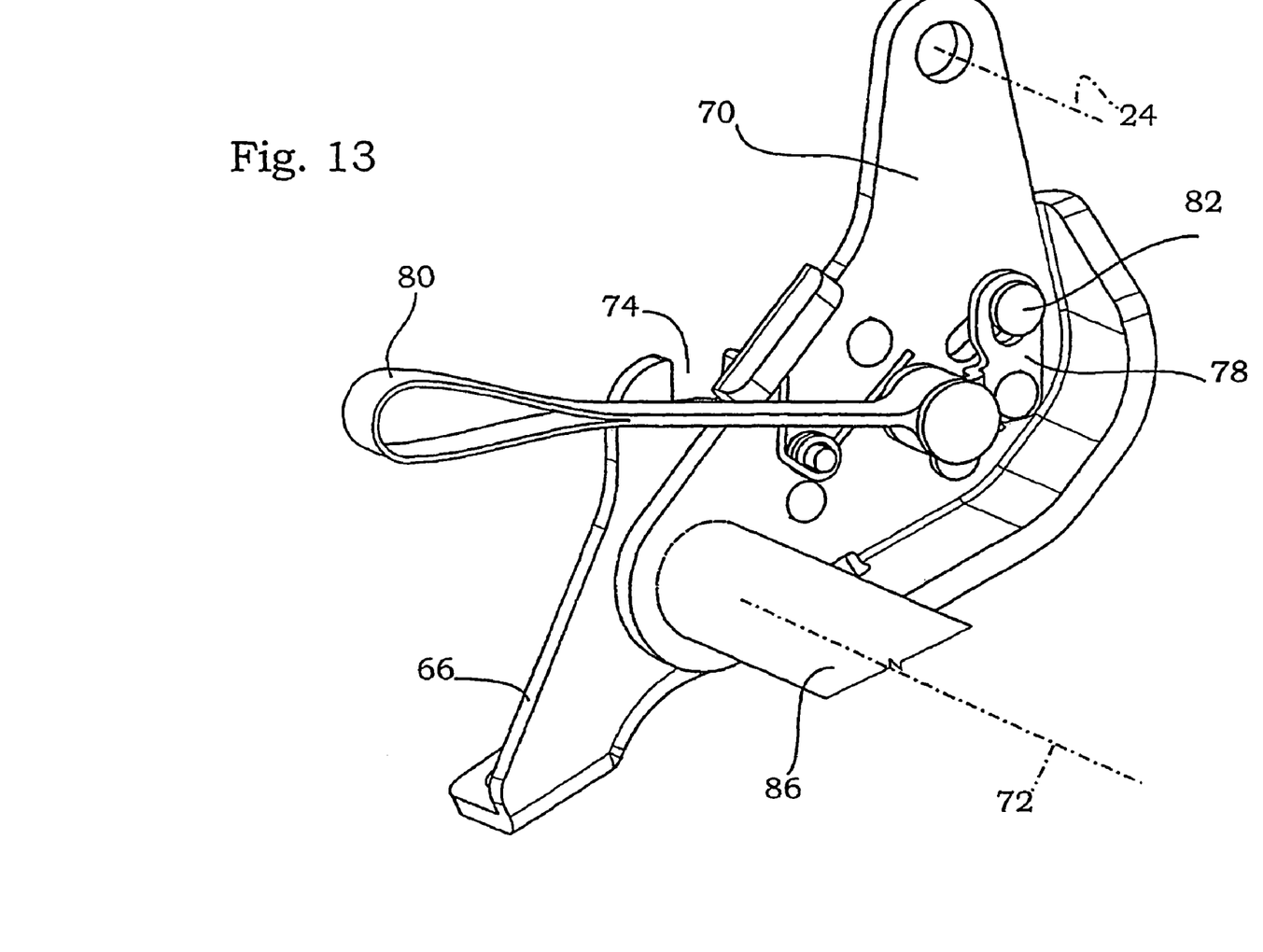
FIG. 13 is a view like FIG. 12, but now in the unlocked position.
Figure 14:
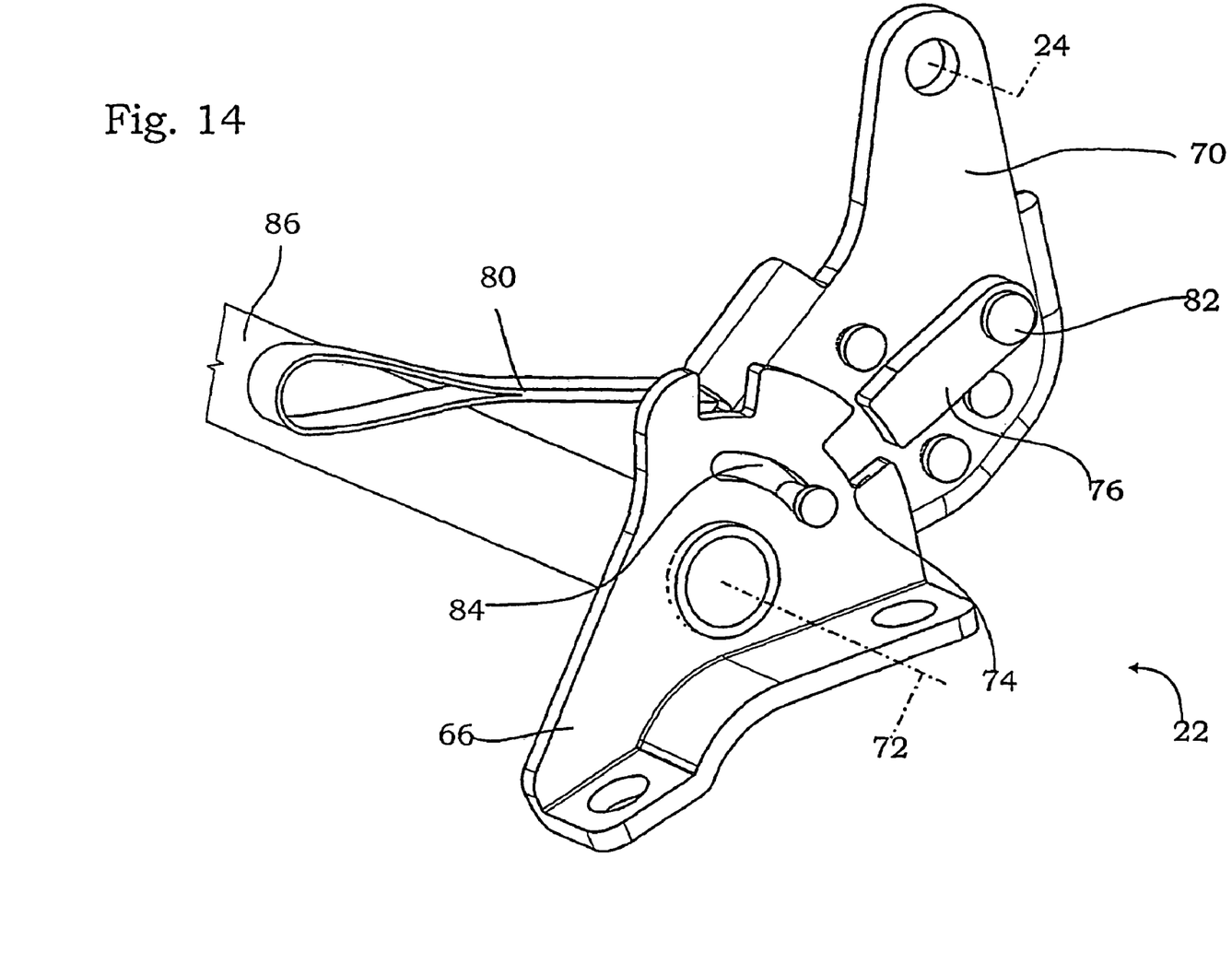
FIG. 14 is a perspective outside view of the hinge intermediate part of FIG. 13.
Figure 15:
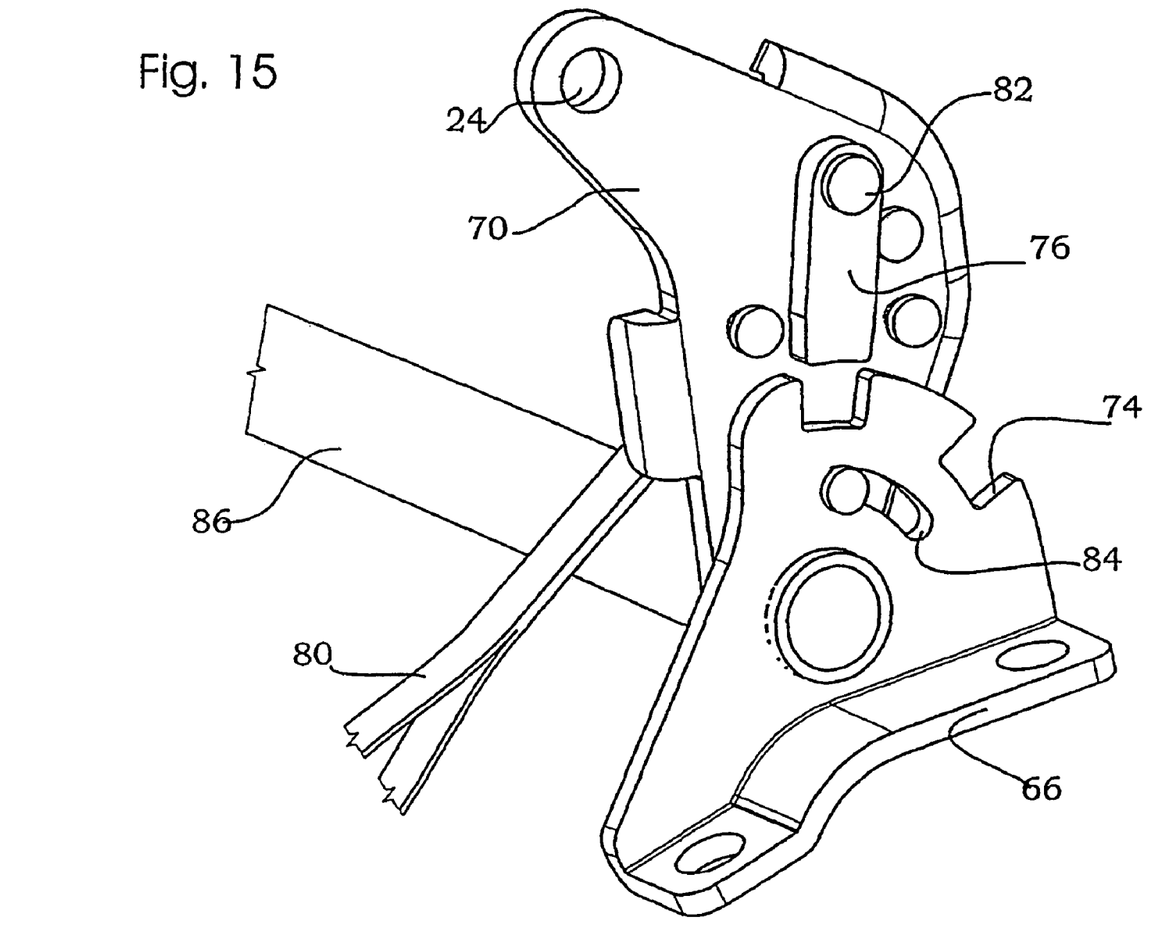
FIG. 15 is an illustration like FIG. 14, but now with the hinge arm being displaced.

FIG. 12 shows the locked state, FIG. 13 shows the unlocked state, but still without adjustment of the hinge intermediate part 70 which is in the same position as in FIG. 12. There is provided a release lever 78 that is disposed on the hinge intermediate part 70 so as to be pivotal about a pivot axis. Its one arm is connected to a pull loop 80. Any other shape of a handle is possible here. Its other arm is provided with a long hole through which a bolt 82 extends that is connected to the locking bar 76. If the release lever 78 is pivoted, as shown in the transition between FIG. 12 and FIG. 13, the locking bar 76 comes out of engagement with the rear locking bight. This state is shown in FIG. 14. Now, the auxiliary pivot hinge is free and may be adjusted. This occurs by the action of a user, for example by actuating the backrest 20. If the hinge intermediate part 70 is brought into the position shown in FIG. 15, the upper locking position is possible and the auxiliary pivot hinge may again be locked.

In the holding part 66, there is further provided a curved guide hole 84 through which a guide pin extends that is connected to the hinge intermediate part 70. The maximum pivot angle is thus fixed. Concurrently, securement is achieved because the guide pin ends on the outside in a disk that straddles the guide hole 84.

As shown in FIG. 16, one active intermediate part is provided for each backrest as is seen in the FIGS. 12 through 16. Said intermediate part is disposed on a seat side, preferably on the outboard side of the vehicle. On the other side, e.g., on the vehicle's inboard side of the backrest, there is provided a passive intermediate part. It only consists of a hinge intermediate part 70 that is solidly connected to a crossbar 86 that forms the pivot axis 64. Accordingly, it is locked when locking occurs on the vehicle outboard side. Each back seat has its own crossbar 86 that respectively forms the pivot axis 64.

In the locked position of the intermediate part described, only the upper main pivot hinge 24, also referred to as a backrest hinge, is allowed to pivot freely. It is not until the locking device 74, 76 described has been released that additional pivotal movement about the auxiliary pivot axis 72 is allowed to occur.

The auxiliary pivot hinge described makes it possible to enlarge the volume of the trunk 62 by reducing the space in front of the backrest 20 in addition to the already described recline adjustment of the backrest 20 and vice versa. In the illustration shown in the FIGS. 1 and 2, the intermediate part described is in the same position as in the FIGS. 12 through 14. In the illustration shown in FIG. 3, the hinge intermediate part 70 is in the position shown in FIG. 15.

The intermediate arrangement described is principally independent of the configuration described herein above in which the backrest 20 abuts a support 44 and the other associated parts. Another variant is also possible, which is to realise the backrest hinge 24 by an adjustable and locking hinge mountings known in prior art. In this case, the angular position of the backrest is retained by the hinge mountings and not by the support 44, the guide rail 28, the slide 30 and so on described herein above.

For the configuration of the described intermediate part between backrest and a carrying structure, for example a seat carrier or a carbody, the applicant reserves the right to apply for an autonomous patent, the configuration of a support and so on only being an advantageous developed implementation that may be replaced by a prior art backrest hinge mountings or by any other fixation of the backrest.

The spacing between the two pivot axes of the backrest 30, meaning of the backrest hinge 24 on the one side and the auxiliary pivot axis 72 on the other side, is about ⅙ of the total length of the backrest 20, this spacing may range between 5 and 30% of the length of the backrest 20. In the normal position as it is shown for example in the FIGS. 1 and 2, the hinge intermediate part 70 is substantially located in the same direction as the backrest 20 and actually extends as a continuation of the backrest 20. In another consideration, it may also be considered a part of a seat carrier. In the forward tilted pivot position of the hinge intermediate part 70 as it is shown for example in FIG. 3, the useful length of the seat part 88 of the vehicle seat is shortened. Shortening is chosen so as to still be tolerable and the length of the hinge intermediate part 70 is selected accordingly. It is possible that the only remaining function is that of an auxiliary seat.

On the backrest frame of the backrest 20 as it is shown in FIG. 16, there may be disposed a fixation for a child seat, e.g., an Isofix fixture. Advantageously, the support 44 is embedded in the backside 26 of the backrest 20, meaning that it protrudes as little as possible therefrom, see FIG. 16.

The invention claimed is:

1. A backrest unit of a motor vehicle seat, with a backrest and with a carrier to which said backrest is hinge-linked, wherein a guide rail located in the x-z plane is disposed on the backside of said backrest, that there is provided a slide that is slidably disposed in this guide rail and is lockable in different positions in said guide rail, that there is provided an actuation device that is associated to said slide and that, upon actuation, brings said slide from a normally locked position into a position in which it has come free and that there is provided a support that has a proximate end hinged to said slide and a remote end that is configured for fixation to a vehicle body part.

2. The backrest as set forth in claim 1, wherein the guide rail is disposed offset toward one seat side.

3. The backrest as set forth in claim 2, wherein the guide rail is offset as far as possible toward a seat outboard side.

4. The backrest as set forth in claim 1, wherein the support has one of (i) a constant length and (ii) an adjustable length.

5. The backrest as set forth in claim 1, wherein the support is embedded in the backside of the backrest.

6. The backrest as set forth in claim 1, wherein the guide rail extends over more than half the height of the backrest.

7. The backrest as set forth in claim 1, wherein the guide rail extends over substantially the entire height of the backrest.

8. The backrest as set forth in claim 1, wherein the backrest is hinge-linked to the carrier at its lower end, that said carrier comprises a retaining part and a hinge intermediate part, that said carrier comprises a locking device that normally blocks the hinge intermediate part with respect to the retaining part and that a release mechanism with a release lever for allowing the locking device to come free upon actuation is associated with this locking device.

9. The backrest as set forth in claim 1, wherein the backrest is connected to the carrier through a free, unlocked backrest hinge.

10. The backrest as set forth in claim 1, wherein the slide comprises at least one locking lever.

11. The backrest as set forth in claim 1, wherein the actuation device comprises a handgrip and a release rod.

12. A motor vehicle with a backrest as set forth in claim 1, wherein the remote end of the support is disposed on a vehicle body part of the vehicle.

13. The motor vehicle as set forth in claim 1, wherein the remote end of the support is hinged to a wheel guard of the motor vehicle.

14. The motor vehicle as set forth in claim 1, wherein the support is at least partially covered by a cover part.

15. The backrest as set forth in claim 1, wherein the support comprises parts that are slidable with respect to each other.

16. The backrest as set forth in claim 1, wherein the backrest unit is for a back seat.

* * * * *